United States Patent [19]
Tran et al.

[11] Patent Number: 5,875,542
[45] Date of Patent: Mar. 2, 1999

[54] METHOD OF MAKING THIN FILM MERGED MAGNETORESISTIVE HEADS

[75] Inventors: Ut Tran, San Jose; Son Tran, Milpitas, both of Calif.

[73] Assignee: Read-Rite Corporation, Milpitas, Calif.

[21] Appl. No.: 844,511

[22] Filed: Apr. 18, 1997

[51] Int. Cl.⁶ .................................................. G11B 5/127
[52] U.S. Cl. ............................................................. 29/603.14
[58] Field of Search .......................... 29/603.13, 603.15, 29/603.16; 360/113

[56] References Cited

U.S. PATENT DOCUMENTS 5,438,747  8/1995  Krounbi et al. ........................... 29/603
5,665,251  9/1997  Robertson et al. ........................ 216/22

*Primary Examiner*—Timothy V. Eley
*Assistant Examiner*—Benjamin M. Halpern
*Attorney, Agent, or Firm*—Nathan N. Kallman

[57] ABSTRACT

Methods for fabricating merged magnetic heads, employing an inductive write head and a magnetoresistive (MR) read head which share portions of the overall magnetic structure, provide for accurate definition of the write track width and for improved alignment of the write gap and the read gap. The method includes accurately forming and defining the nonmagnetic write gap prior to fabricating the inductive write coil structure and subsequently formed higher topology elements. The methods provide for better control of the widths of the top pole member and the bottom pole member, thereby resulting in substantially equal widths for these pole members.

15 Claims, 7 Drawing Sheets

METHOD OF MAKING THIN FILM MERGED MAGNETORESISTIVE HEADS

FIELD OF THE INVENTION

The present invention relates to thin film merged magnetoresistive heads and to methods of manufacturing such heads.

DESCRIPTION OF THE PRIOR ART

Present day data storage apparatus, such as disk drives, employ thin film magnetic heads because they provide high areal recording density. A magnetoresistive (MR) read head employs an MR element which changes resistance in response to magnetic flux from a record medium adjacent to the sensing edge of the head. A sense current which is passed through the MR element varies as a function of a change in resistance of the MR element. The MR element may be in the form of a thin film layer that is located between bottom and top gap insulation layers. The insulatin layers are located between bottom and top magnetic shield layers. The distance between the shield layers defines the read gap; the smaller the read gap, the greater the resolution of the MR read head. The response of the MR element is based on how accurately the resistance change of the MR element follows the change in flux density sensed from the magnetic medium.

A recent advance has provided a so-called merged MR head, which employs an MR read head and an inductive write head in a common structure. This is accomplished by using a portion of the top shield layer of the MR read head as a portion of the bottom pole of the inductive write head. The use of such a merged MR head structure saves processing steps as compared with fabricating separate read and write heads because a portion of the top shield layer of the MR read head also serves as the bottom pole for the write head, thereby eliminating a fabrication step. Another advantage of such a merged MR head is that the elements of the read and write structures can be more easily aligned on a single suspension system for reading immediately after writing.

However, present merged MR head structures generate significantly large side-fringing fields during recording. These fields are caused by write flux leakage from the top pole to the parts of the bottom pole beyond the region defined. The side-fringing fields limit the minimum track width achievable and therefore limit the upper reach of track density. Consequently, when a track written by the recording element of a merged MR head is read by the MR element, the offtrack performance of the MR element can be degraded. That is, when the MR read element is moved laterally from the center of a track being read, it cannot move far before interference from the magnetic field of the adjacent track begins to affect the magnetic field of the track being read.

Present methods for fabricating a merged MR head deposit a nonmagnetic write gap layer on top of the second shield layer and then deposit the top pole member on the gap layer. The width of the second pole member is kept as narrow as possible so as to limit the width of the written tracks. However, the second shield layer of the MR read head should be very wide in order to properly shield the MR element. This difference between the width of the second pole member and the width of the second shield layer results in a side-fringe flux field between the pole members, which side-fringe flux field extends laterally beyond the width of the top pole member. This is caused by the width of the second shield layer, which provides a large lateral channel for the flux lines from the top pole member.

One solution to the side-fringing field problem of a merged MR head is to construct a narrow pole member PT1B on the top of the second shield layer, the second shield layer itself then serving as a wider, bottom pole member PT1A. Both of these pole members PT1A and PT1B form the pole member portion PT1 of the bottom pole member. A nonmagnetic write gap layer is then formed on top of the narrow pole member PT1A, and the pole member PT2 of the top pole is formed on top of the gap layer. Methods for constructing such prior art structures as described above are discussed in U.S. Pat. No. 5,438,747, Krounbi et al. The Krounbi et al patent discusses techniques for notching the underlying magnetic pole PT1B using the pole PT2 as a mask. These methods result in good vertical alignment of the sidewalls of the PT1B and the PT2 poles.

SUMMARY OF THE PRESENT INVENTION

In accordance with the present invention, a method is provided for fabricating a merged thin film head in which the trackwidth of the write portion of the head is defined early in the fabrication process, before the higher topology of the head, such as the write coil, is formed. This results in substantially equal widths for the top pole member and the bottom pole member.

DESCRIPTION OF THE PREFERRED EMBODIMENT

Figure 1A:
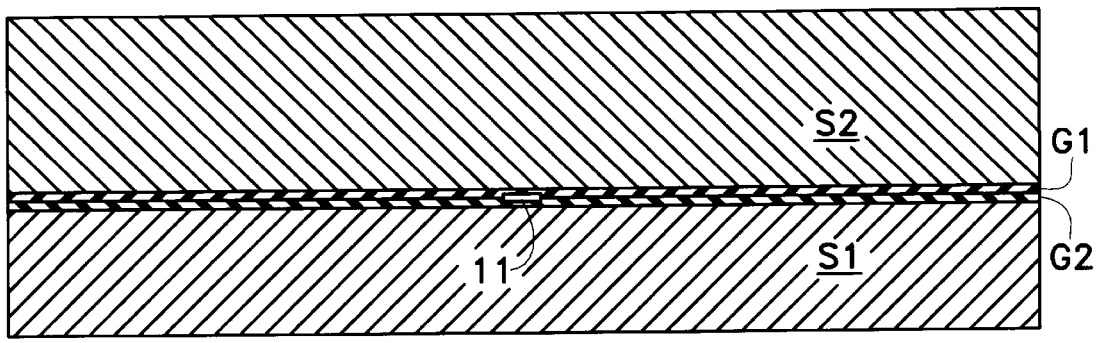
Figs. 1A–1J are partial cross-sectional views showing a sequence of steps in one method of fabricating a merged MR head in accordance with this invention.

With reference to FIG. 1A, an MR read/inductive write head is shown at a stage after formation of an MR sensing element 11 between a pair of nonmagnetic read gap layers G1, G2. Gap layers G1, G2 are positioned between a first magnetic shield member S1 and a second magnetic shield member S2. Shields S1, S2 may be formed of any magnetic material having a high magnetic induction $B_s$, such as NiFe, a NiFeCoX alloy, a CoZrX alloy, or an iron based alloy, where X is an additional metal material. Shield S2 is preferably slightly thicker than shield S1, as indicated in FIG. 1A. The structure shown in FIG. 1A represents elements well known in the art of MR head fabrication.

Figure 1B:
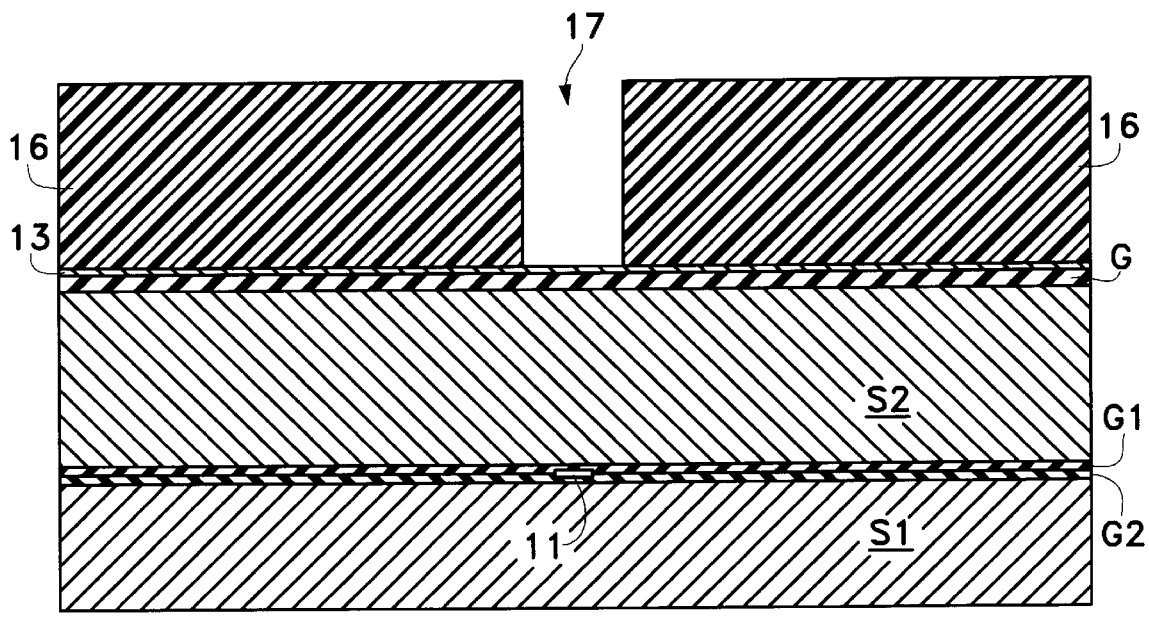

FIG. 1B shows the deposition of a nonmagnetic write gap layer G on the surface of shield S2, gap G being of a suitable magnetically insulating material to provide a nonmagnetic layer between the upper portion of shield S2 (which portion will become a write pole member in the completed structure) and a subsequently deposited material which will form another write pole member. A thin NiFe seed layer 13 is then deposited on gap layer G to allow the formation of a magnetic layer, as is well known in the art.

Figure 1C:
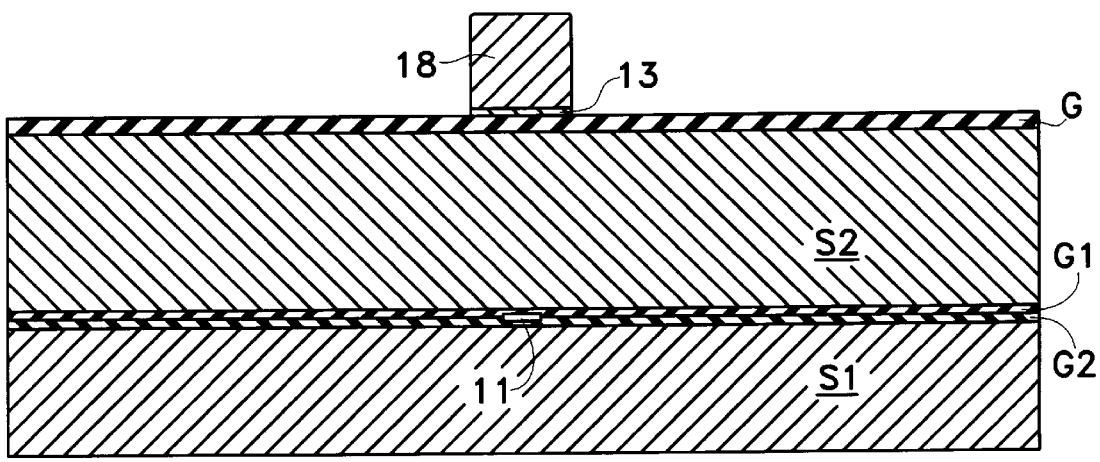

A photoresist mask 16 which is utilized to define the track opening width 17 of the write element is then placed on the central portion of seed layer 13 to define a pattern for the deposition of metal material which will act as a mask for subsequent ion milling. A metal material such as NiFe, Cu, or Cr is deposited by plating in opening 17 on seed layer 13, and mask 16 is then removed, leaving the structure as shown in FIG. 1C with metal layer 18. Alternatively, layer 18 may be formed by a dry process such as depositing NiFe, diamond-like-carbon (DLC), Ti or Ta on top of gap layer G.

Figure 1D:
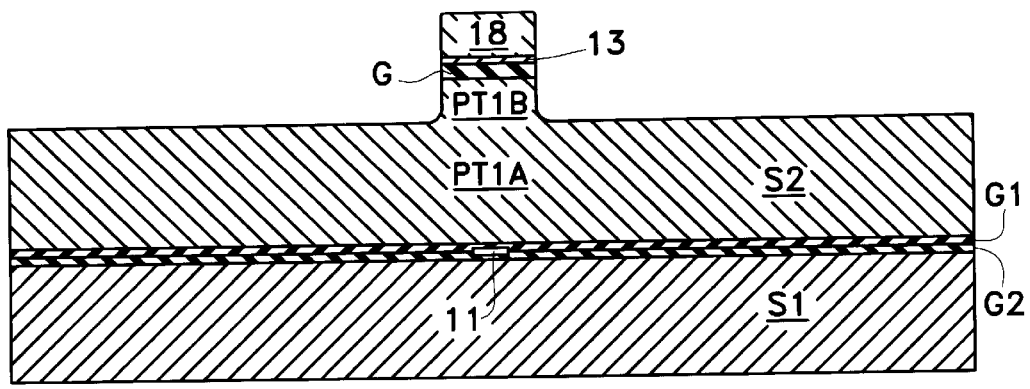

As shown in FIG. 1D, the portions of gap layer G and shield S2 on either side of material 18 are then ion milled to remove the material of shield S2 to a depth of about one micron. This leaves a structure having a thickness of greater than 1.5 microns, including a first pole member PT1A which is shared with shield S2, an additional first pole member PT1B, write gap layer G, seed layer 13 and a portion of metallic material 18.

Figure 1E:
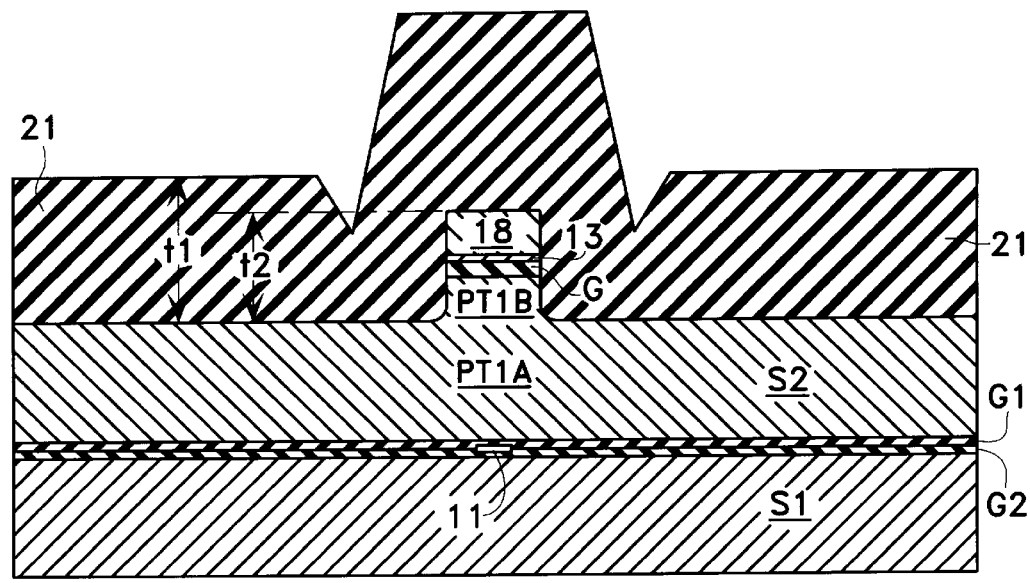
Figure 1F:
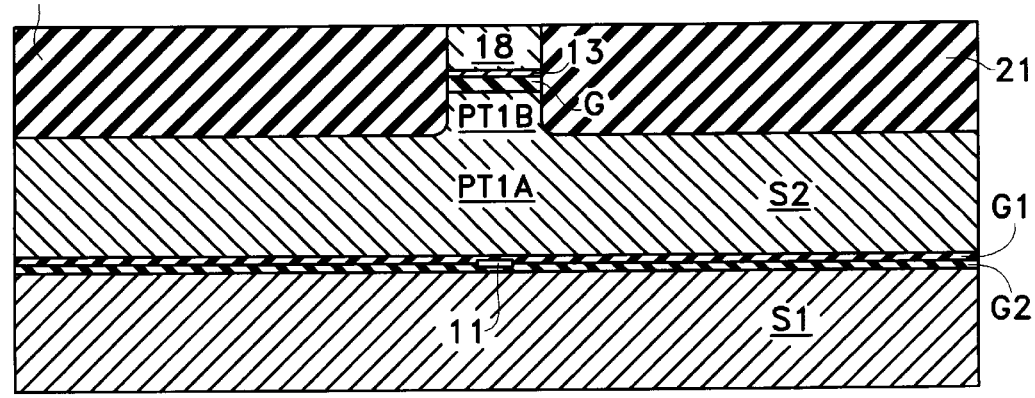

With reference to FIG. 1E, a layer 21 of alumina is applied by sputtering or other vacuum deposition technique forming the pattern shown. Layer 21 is deposited such that the thickness t1 of the layer over and around the area of pole member PT1B, gap layer G, seed layer 13 and metal layer 18 is at least 1 micron greater than the combined thickness t2 of layer 18, seed layer 13, gap G and pole member PT1B, to allow tolerance for subsequent planarization. As shown in FIG. 1F, a planarization lapping process is then employed to remove the top portion of alumina layer 21 and to expose the upper portion of layer 18.

Figure 1G:
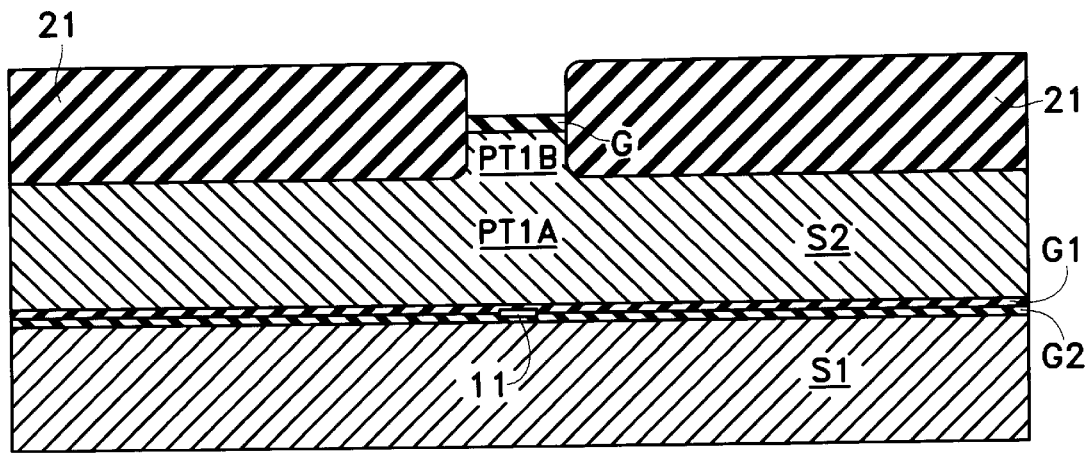
Figure 1H:
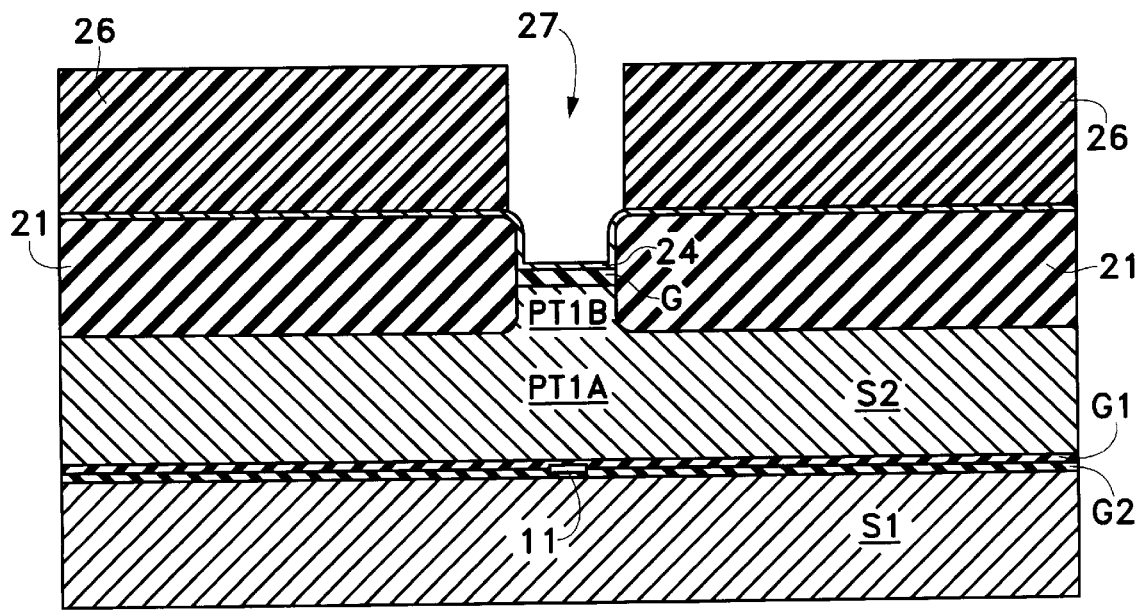
Figure 1I:
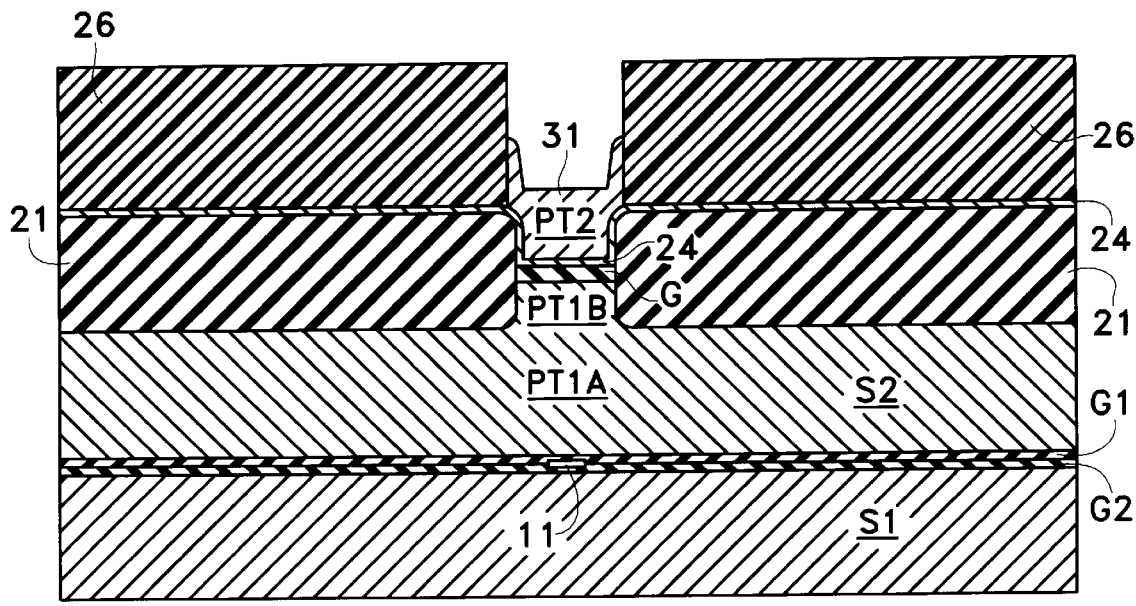
Figure 1J:
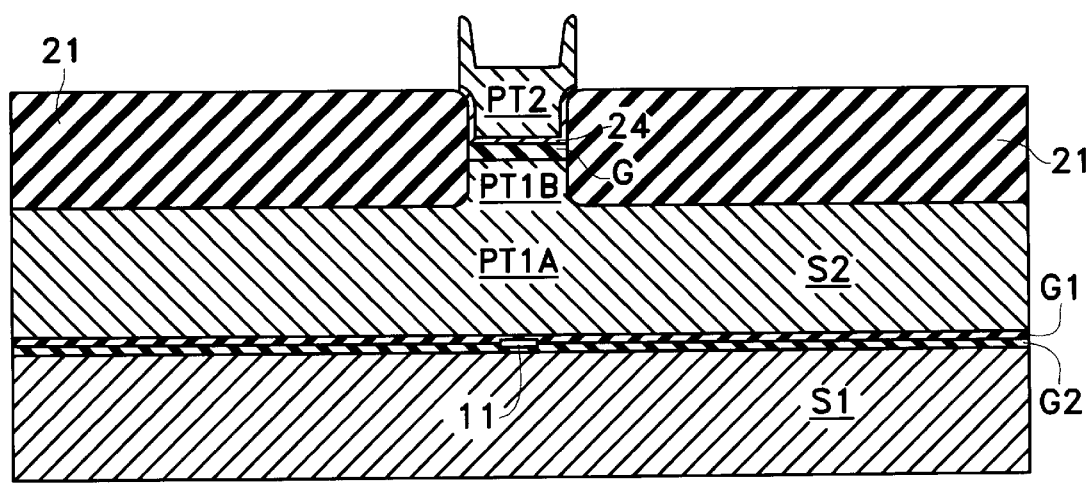

A wet etching processing may then be employed to remove the residual material 18 and seed layer 13, as shown in FIG. 1G. Following this, and after fabrication of conventional write coils and photoresist insulation (not shown), a new seed layer 24 is deposited on alumina layer 21 and write gap layer G (FIG. 1H). A photoresist masking layer 26 is applied to seed layer 24, leaving an opening 27 into which is plated a layer 31 of magnetic material (FIG. 1I) having a high magnetic inductance $B_s$ similar to the material of pole members PT1A and PT1B. Following this, photoresist material 26 and seed layer 24 in the area around the pole member portion are removed (FIG. 1J), and known copper stud and alumina overcoat operations are performed to complete the fabrication process.

Figure 2A:
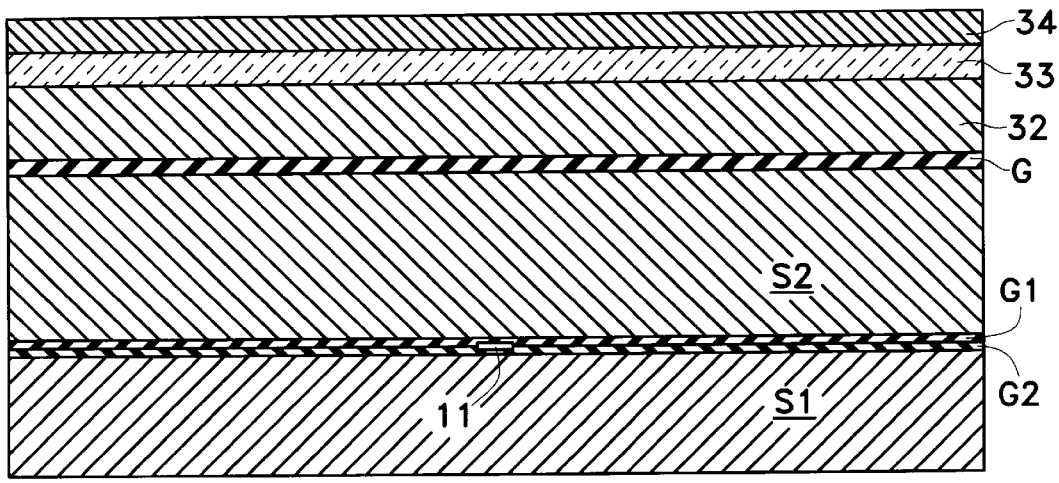
FIGS. 2A–2C are partial cross-sectional views showing alternative processing steps in a portion of the fabrication process shown in FIGS. 1A–1J.
Figure 2B:
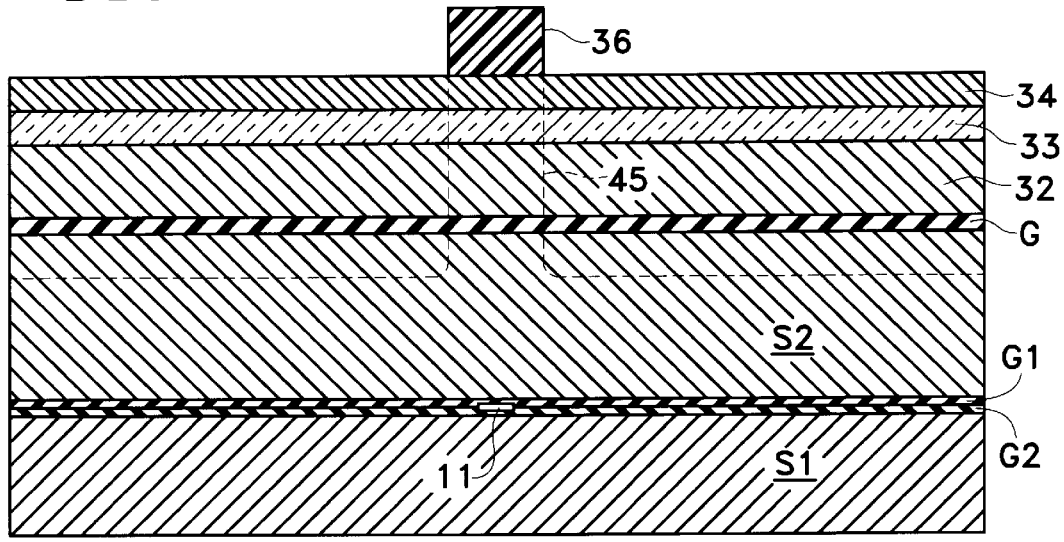
Figure 2C:
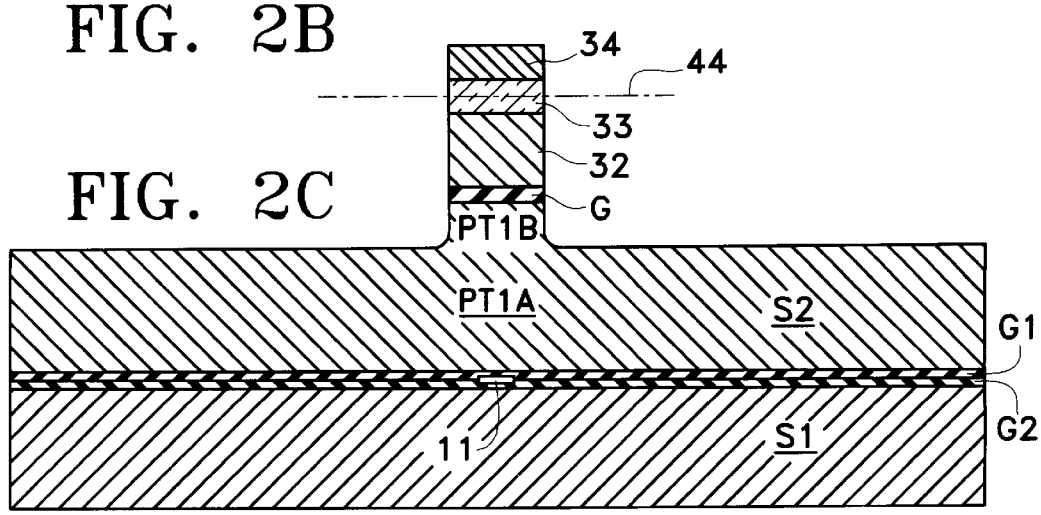

As an alternative to the initial steps in the fabrication process, the steps shown in FIGS. 2A–2C may be employed. In FIG. 2A, after formation of shield layers S1 and S2, gap layers G1 and G2 and MR sensing element 11, as before, a layer 32 of NiFe or other magnetic alloy is deposited on the upper surface of gap layer G. This is followed by sputtering a layer 33 of diamondlike carbon (DLC) on layer 32. Layer 33 will be used as a lapping stop in a subsequent planarization process. Next, a layer 34 of Ti, $TiO_2$ or Ta of approximately 500–1000Å thickness is sputtered on DLC layer 33. Layer 34 will be used as a mask during a reactive ion etch (RIE) of layer 33. Then as shown (FIG. 2B), a spin resist coating 36 of less than 1 micron thickness is applied to the pole member region as shown. Layer 36 is used to define the track width as well as a mask during ion beam milling or reactive ion etch of layer 34. The portions of S2, gap layer G and layers 32, 33, 34 outside of photoresist 36 are then removed by reactive ion etching or the like along the lines of dotted outline 45, to leave a structure as shown in FIG. 2C. This structure may then be lapped along a lap line 44 for further processing. The remainder of DLC layer 33 is then removed by reactive ion etching, leaving a structure similar to that of FIG. 1D, and further processing continues as shown in FIGS. 1E–1J.

Figure 3A:
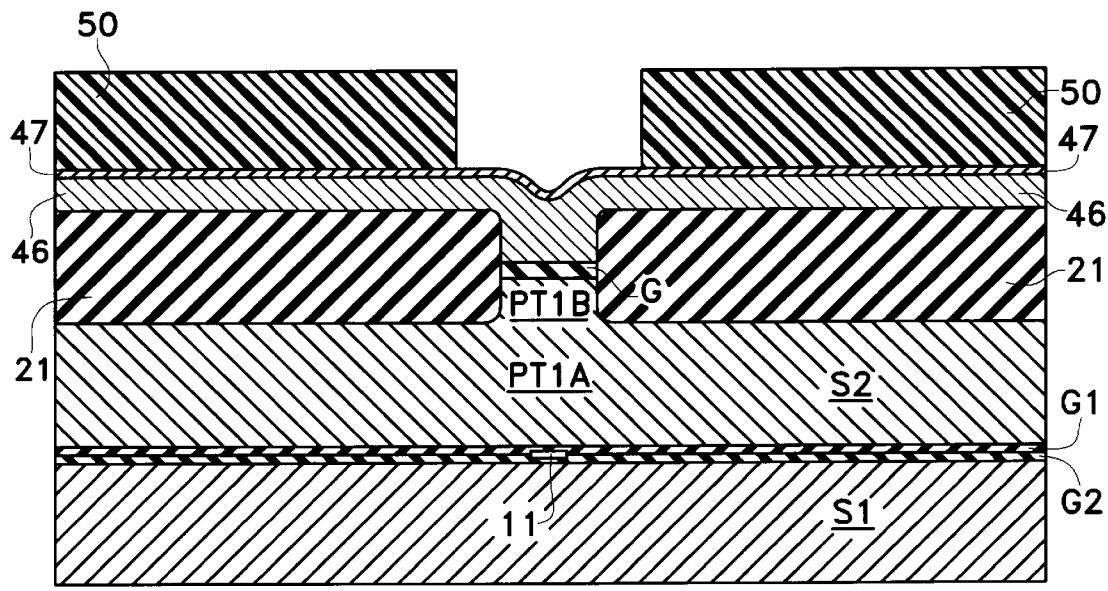
FIGS. 3A–3C are partial cross-sectional views of alternative processing steps which may be employed instead of the steps of FIGS. 1A–1J.
Figure 3B:
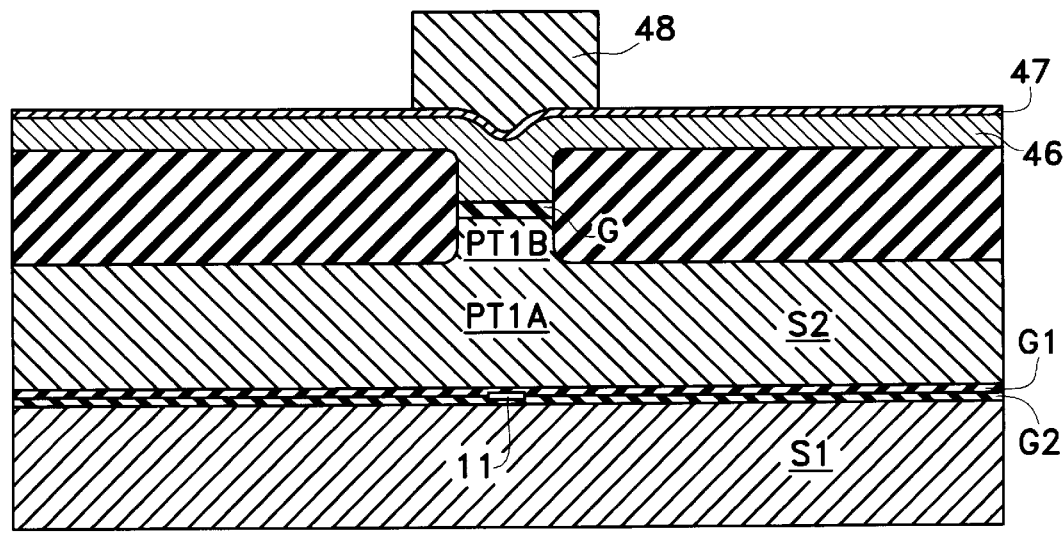
Figure 3C:
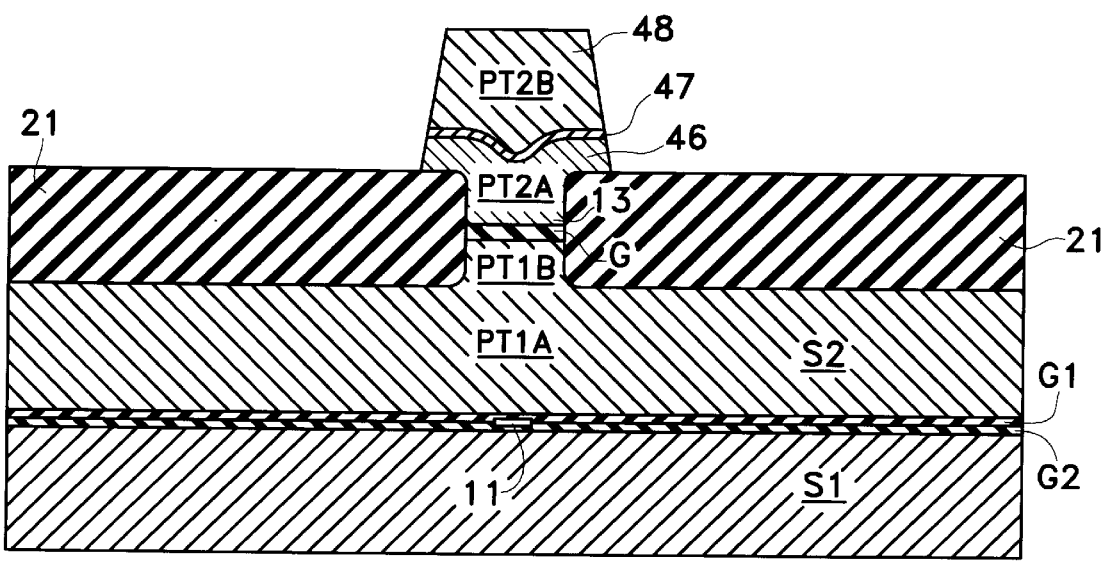

FIGS. 3A–3C show details of alternative process steps which may be employed following the step shown in FIG. 1G. The steps of FIGS. 3A–3C are utilized to provide a sputtered magnetic film as part of the top pole member PT2 of the write head. In FIG. 3A, a layer 46 of magnetic material having a high $B_s$ is deposited on gap G. A NiFe seed layer 47 is then deposited on top of high $B_s$ layer 46, and a photoresist pattern 50 is formed to allow electroplating a layer 48 of NiFe or other magnetic material on seed layer 47. Layer 48 may have different magnetic properties, such as a lower saturation Bs, than those of the material of pole members PT1A, PT1B AND PT2A.

Layer 48 preferably has a thickness as plated in a range of 4–6 microns. In FIG. 3B, the plated NiFe layer 48 forms pole member PT2B and acts as a shield for ion milling NiFe seed layer 47 and high $B_s$ layer 46 in the area surrounding the pole member. In FIG. 3C, the cross-section of the pole member shows the seed layer 47 and high $B_s$ layer 46 around the pole member removed, leaving the structure as shown.

What is claimed is:

1. A method of fabricating a merged magnetic head having an inductive write portion and a magnetoresistive read portion comprising the steps of:

forming a magnetoresistive sensing element between first and second magnetic shield layers;

depositing a nonmagnetic write gap layer on said second shield layer;

depositing a metal layer in a central portion of said write gap layer;

removing the portions of said write gap layer and the portions of said second shield layer in the areas adjacent to said central portion of said write gap layer for forming a first magnetic write pole member and a write gap member in said central portion of said second shield member;

removing said deposited metal layer in said central portion; and depositing a first magnetic layer on said write gap member in said central portion to form a second write pole member.

2. A method in accordance with claim 1 in which said first magnetic layer for forming said second write pole member has different magnetic properties than said first write pole member.

3. A method in accordance with claim 2 in which said second write pole member has a higher magnetic saturation value than said first write pole member.

4. A method in accordance with claim 1 including the step of depositing a first magnetic seed layer on said write gap layer prior to depositing said metal layer.

5. A method in accordance with claim 4 including the steps of:

removing said first magnetic seed layer at the time of removing said deposited metal;

depositing a second magnetic seed layer on said write gap layer; and depositing a second magnetic layer on said second seed layer in said central portion to form a second magnetic write pole member.

6. A method in accordance with claim 1 including the steps of:

depositing a layer of nonmagnetic material on said deposited metal layer and said second shield layer; and planarizing said deposited nonmagnetic layer to expose the top of said deposited metal layer prior to removing said deposited metal layer.

7. A method in accordance with claim 6 in which said layer of nonmagnetic material is deposited to a thickness at least one micron greater than the combined thickness of said first pole member, said write gap layer and said deposited metal layer.

8. A method in accordance with claim 6 including the step of masking said planarized deposited nonmagnetic layer except in the area of said central portion prior to depositing said magnetic layer to form said second pole member.

9. A method in accordance with claim 1 in which said deposited metal layer is a magnetic metal layer.

10. A method of fabricating a merged magnetic head having an inductive write portion and a magnetoresistive read portion comprising the steps of:

forming a magnetoresistive sensing element between first and second magnetic shield layers;

depositing a nonmagnetic write gap layer on said second shield layer;

depositing a first magnetic metal layer on said write gap layer;

depositing a layer of diamond-like carbon material on said first magnetic metal layer;

depositing a nonmagnetic layer on said layer of diamond-like carbon material;

removing said nonmagnetic layer, said diamond-like carbon layer, said magnetic metal layer, said write gap layer, and a portion of said second shield layer in the areas adjacent to a central portion of said second shield layer to form a first magnetic write pole member in said central portion of said second shield layer;

removing said nonmagnetic layer and said diamond-like carbon layer in said central portion;

removing said deposited first magnetic metal layer in said central portion; and depositing a second magnetic layer on said write gap layer in said central portion to form a second write pole member.

11. A method in accordance with claim 10 in which said second magnetic layer forming said second write pole member has different magnetic properties than said first write pole member.

12. A method in accordance with claim 11 in which said second magnetic layer forming said second write pole member has a higher magnetic saturation value than said first write pole member.

13. A method in accordance with claim 1 including the step of depositing a second magnetic layer on said first magnetic layer, said first and said second magnetic layers forming a second magnetic write pole member.

14. A method in accordance with claim 13 in which said first magnetic layer and said second magnetic layer have different magnetic properties.

15. A method in accordance with claim 14 in which said first magnetic layer has a higher magnetic saturation value than said second magnetic layer.

* * * * *